US008342391B2

(12) United States Patent
Morrison et al.

(10) Patent No.: US 8,342,391 B2
(45) Date of Patent: Jan. 1, 2013

(54) TRAVEL KIOSK

(75) Inventors: Randall L. Morrison, Oviedo, FL (US); Rafael Yepez, Sanford, FL (US)

(73) Assignee: NCR Corporation, Duluth, GA (US)

( * ) Notice: Subject to any disclaimer, the term of this patent is extended or adjusted under 35 U.S.C. 154(b) by 864 days.

(21) Appl. No.: 12/337,879

(22) Filed: Dec. 18, 2008
(Under 37 CFR 1.47)

(65) Prior Publication Data
US 2010/0155462 A1 Jun. 24, 2010

(51) Int. Cl.
*G06F 17/00* (2006.01)
(52) U.S. Cl. ........................................ 235/375; 235/380
(58) Field of Classification Search .................. 235/484; 271/207; 400/625; 382/118
See application file for complete search history.

(56) References Cited

U.S. PATENT DOCUMENTS

| | | | |
|---|---|---|---|
| 5,061,098 A * | 10/1991 | Engelhardt et al. ........... 400/625 |
| 6,767,093 B1 | 7/2004 | Martin et al. |
| 7,152,972 B2 * | 12/2006 | King et al. ..................... 347/104 |
| 2005/0137942 A1 * | 6/2005 | LaFleur .......................... 705/27 |
| 2005/0275157 A1 * | 12/2005 | Mindler et al. ............... 271/207 |
| 2008/0122164 A1 * | 5/2008 | Sparer et al. ................. 271/207 |
| 2008/0296394 A1 * | 12/2008 | Melnik et al. ................. 235/485 |
| 2009/0129638 A1 * | 5/2009 | Kim ............................. 382/118 |

* cited by examiner

*Primary Examiner* — Thien M Le
*Assistant Examiner* — Sonji Johnson
(74) *Attorney, Agent, or Firm* — Paul W. Martin; Peter H. Priest

(57) ABSTRACT

A travel kiosk with improved document delivery. The travel kiosk includes a first section containing a touch screen, and a second section adjacent the first section including an aperture and a document delivery tray within the aperture. The document delivery tray includes a first portion including a document slope for receiving a document at an upper end from a printer, the document falling to a lower end of the document slope, the document slope including ribs oriented generally downwardly to minimize friction between the document and the document slope. A second portion coupled to the first portion at the lower end includes first and second tabs which form a landing zone for the document after it has fallen from the document slope.

15 Claims, 5 Drawing Sheets

TRAVEL KIOSK

BACKGROUND

Travel kiosks typically consist of stand alone peripherals to a primary self service device. These peripherals may be included within the overall millwork or enclosure of the travel kiosk so as to appear to be integrated but have separate work areas to deliver travel documents and read barcodes on travel documents, read passports, and read contactless cards.

It would be desirable to provide a travel kiosk that integrates a document delivery and other functions in a common work area.

SUMMARY

A travel kiosk is provided.

The travel kiosk includes a first section containing a touch screen, and a second section adjacent the first section including an aperture and a document delivery tray within the aperture. The document delivery tray includes a first portion including a document slope for receiving a document at an upper end from a printer, the document falling to a lower end of the document slope, the document slope including ribs oriented generally downwardly to minimize friction between the document and the document slope. A second portion coupled to the first portion at the lower end includes first and second tabs which form a landing zone for the document after it has fallen from the document slope.

DETAILED DESCRIPTION

Figure 1:
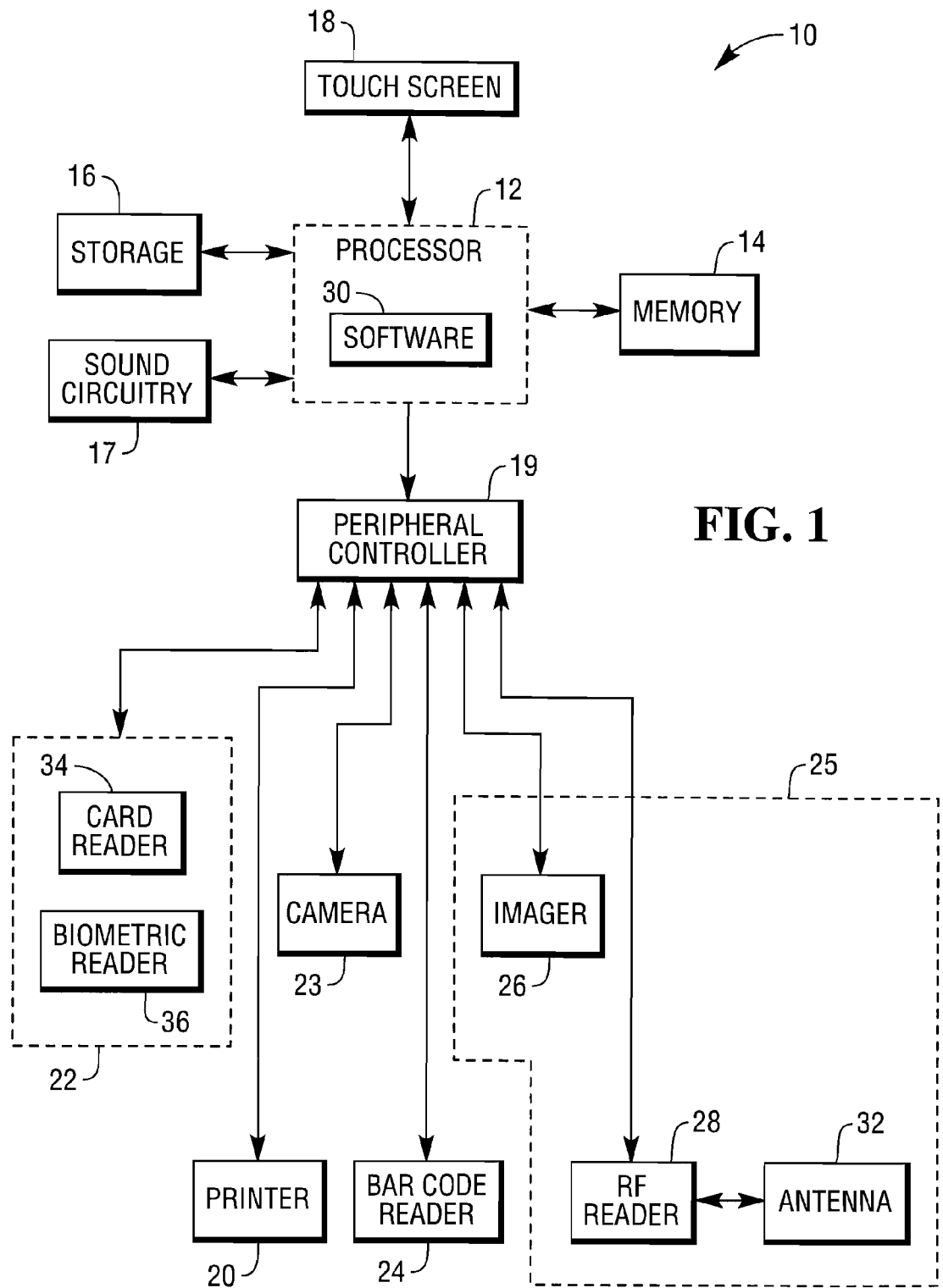
FIG. 1 is a block diagram of an example travel kiosk.

With reference to FIG. 1, travel kiosk 10 includes processor 12, memory 14, storage 16, and touch screen 18.

Processor 12 executes software 30 for displaying instructions, issuing prompts, and receiving inputs from users through touch screen 18. Processor 12 loads software 30 from storage 16 into memory 14 during execution.

Kiosk 10 may additionally include sound circuitry 17 for providing aural feedback to an operator during use of kiosk 10 and its peripherals. Sound circuitry 17 may include a tone generator and speakers.

Software 30 also controls a number of peripheral modules through one or more peripheral controllers 19. Peripheral controller 19 may include a serial controller, such as an RS232 or Universal Serial Bus (USB) controller.

Kiosk 10 includes a peripheral 22, which includes card reader 34 and biometric reader 36. Card reader 34 reads cards such as payment cards, loyalty cards, and driver's licenses under the control of software 30. Card reader 22 may include any of the known types of magnetic card readers, including a manual drag-through slot card reader, a motorized card reader, or an insertion type push-pull card reader.

Biometric reader 36 may include a fingerprint reader.

Kiosk 10 may include other peripherals necessary for its purpose. For example, kiosk 10 may include printer 20, camera 23, barcode reader 24, and passport reader 25.

Printer 20 prints documents related to the purpose of self-service terminal 10, including receipts, tickets, boarding passes, and agendas under the control of software 30.

Barcode reader 24 reads barcode labels on documents related to the purpose of self-service terminal 10, such as receipts, coupons, driver's licenses, and travel documents under the control of software 30. Barcode reader 24 may also read barcodes displayed by portable devices, such as cell phones, personal digital assistants, and hand-held computers.

Passport reader 25 obtains information from passport 38. Passport reader 25 may include imager 26 and RF reader 28.

Imager 26 captures an image of a machine readable zone on passports under the control of software 30. Software 30 obtains information from the image via optical character recognition.

RF reader 28 interrogates and reads data from RF chips in passports through antenna 32 and under the control of software 30. RF reader 28 may also be used to read contactless payment cards.

Figure 2:
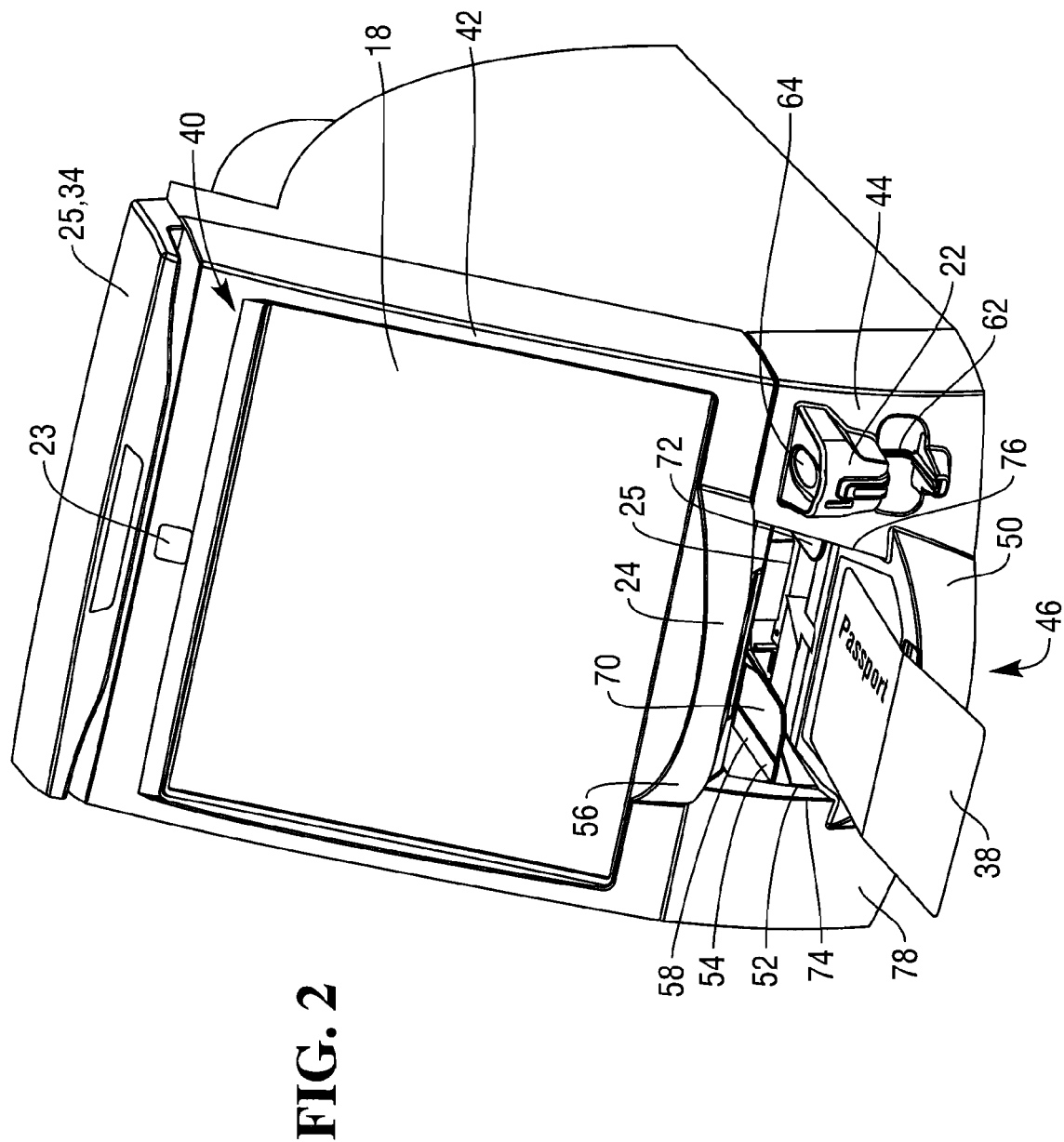
FIG. 2 is a perspective view of the example travel kiosk.
Figure 3:
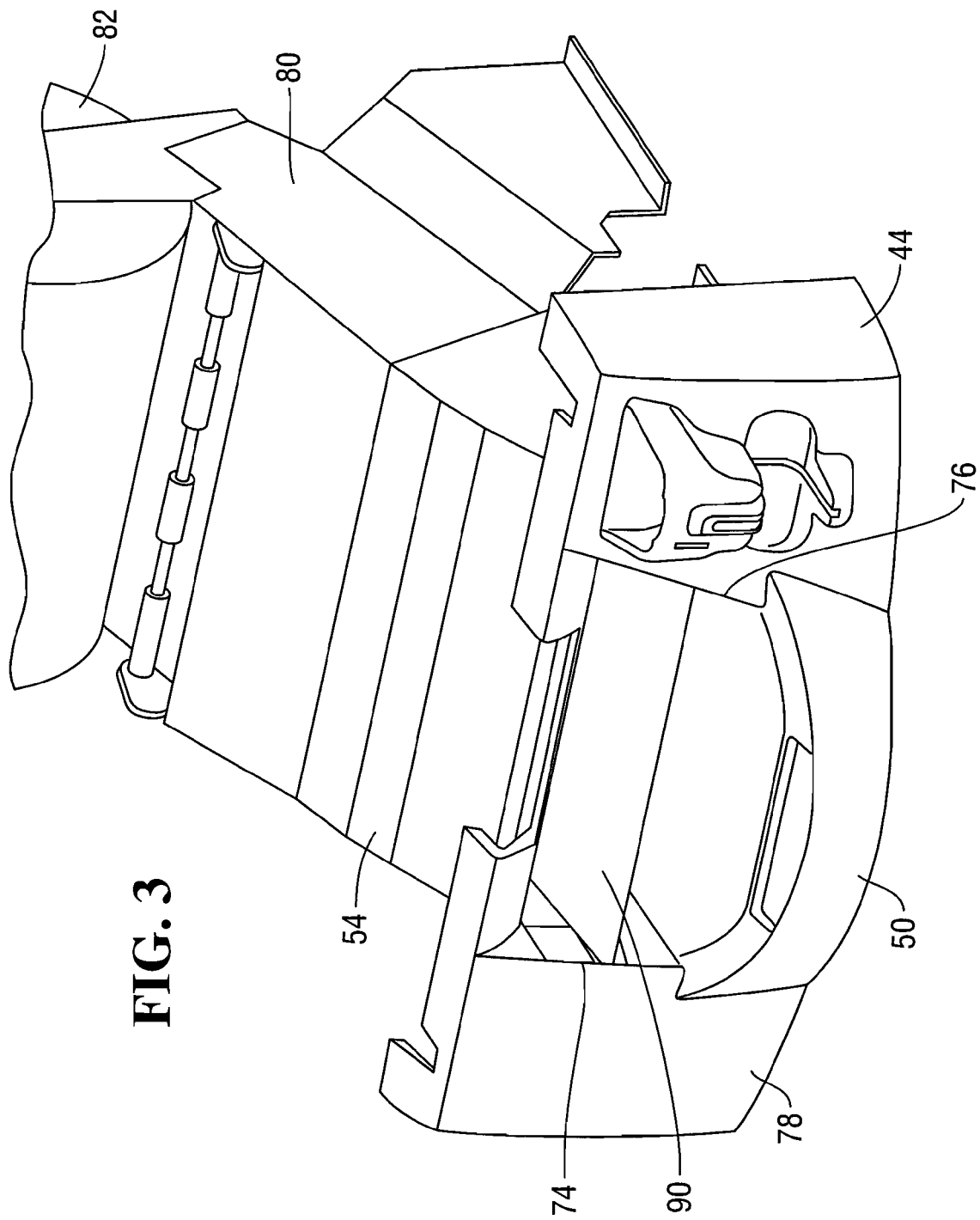
FIG. 3 is an inside perspective view of the example travel kiosk illustrating a thermal printer and paper delivery chute with a dispensed travel document.

Turning now to FIGS. 2 and 3, example travel kiosk 10 is illustrated in further detail.

Travel kiosk 10 includes a front surface 40 that provides a point of focus for user interaction. Front surface 40 includes top portion 42 and bottom portion 44.

Top portion 42 includes touch screen 18 and camera 23. Touch screen 18 provides a point of focus for users during display of instructions and receipt of touch entered data from users.

Camera 23 captures images of users. These images may be used for security, video logging, and facial recognition.

Top portion 42 may additionally include an additional passport reader 25 or card reader 34.

Bottom portion 44 includes peripheral 22, barcode reader 24, and passport reader 25, which is equipped with a radio frequency (RF) antenna for reading electronic passport chips, contactless payment cards, and other RF devices.

Components in bottom portion 44 and organized into a work area 46 that provides a point of focus for users during printing of travel documents, reading of magnetic and contactless cards, reading of passports, scanning of barcodes on travel documents, and reading of biometric data.

Work area 46 includes shelf 50, tunnel 52, and overhang 56.

Tunnel 52 provides user access to paper chute 54 and passport reader 25. Tunnel 52 is located within wall 78, which includes left and right edges 74 and 76.

Printer exit chute 54 provides a landing zone in work area 46 for depositing travel documents for user pickup. Landing zone 58 is defined by paper support tabs 70 and 72, which are located in tunnel 52 above shelf 50 with sufficient clearance so as not to interfere with passport reading, at approximately half-way up the tunnel opening. Paper support tabs 70 and 72 also flatten passport bindings below during passport reading.

Tunnel 52 has a width which prevents travel documents from falling through. The width of travel documents is slightly wider than the width of tunnel 52 as defined by left and right edges of 74 and 76.

Overhang 56 contains barcode reader 24 underneath. Barcode reader 24 is aimed in a generally downward direction in order to read barcode labels oriented upwards on travel documents placed in work area 46.

Adjacent work area 46 is an example peripheral 22, which includes magnetic stripe reader 62 and fingerprint reader 64.

With reference to FIG. 3, paper chute 54 is further exposed.

At one end, paper chute 54 couples behind wall 78 of bottom portion 44. At another end, paper chute couples to printer 80. Printer 80 further couples to paper roll 82. A travel document 90 is positioned within landing zone 58.

Figure 4:
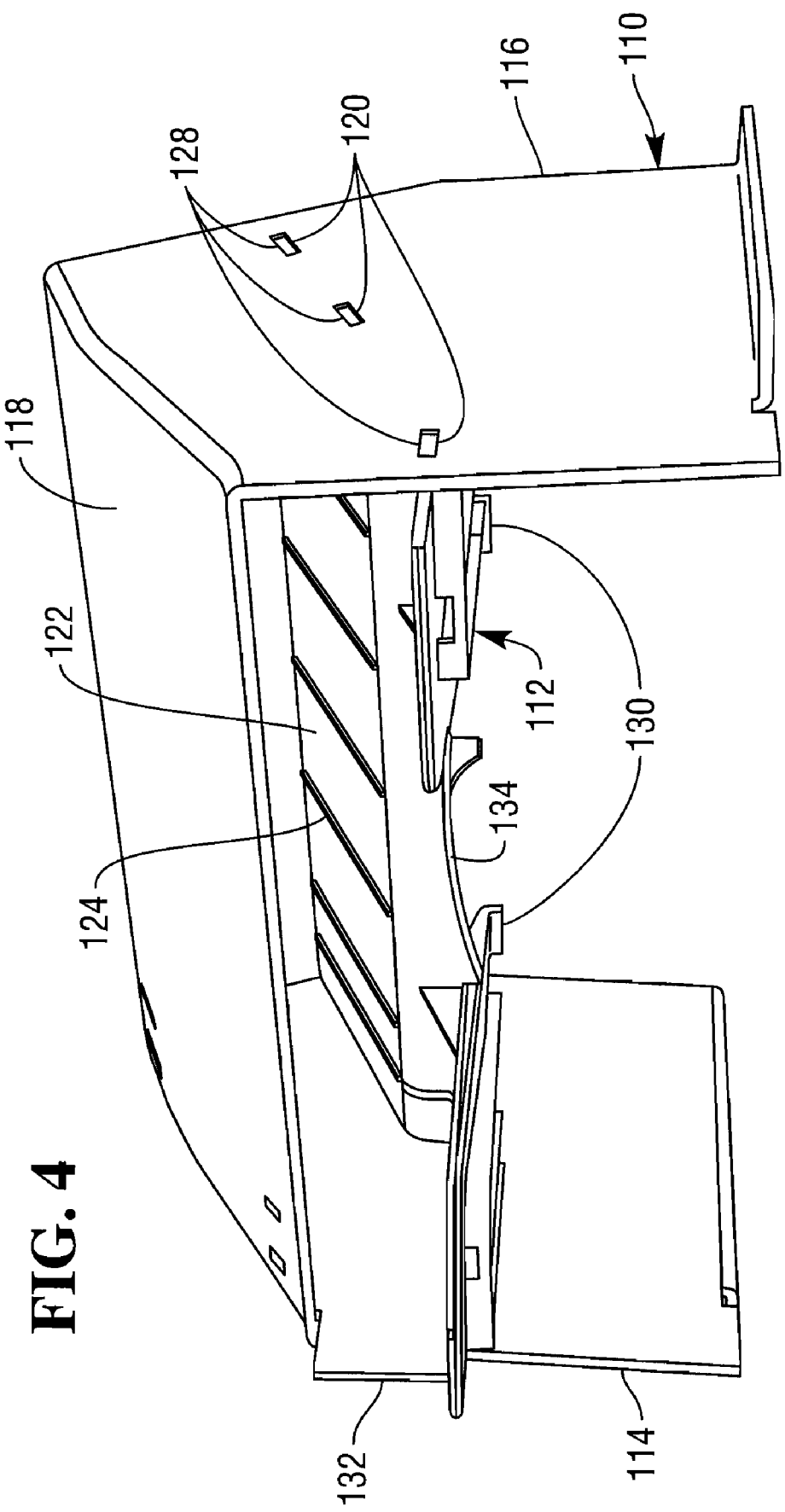
FIG. 4 is a perspective view of the paper delivery chute.

With reference to FIG. 4, an example paper chute 54 is formed from hood 110 and tray 112.

Hood 110 includes vertically oriented left and right sides 114 and 116, and a top side 118. Left and right sides 114 and 116 include apertures 120. Top side 116 is sloped in a generally downward direction.

Tray 112 includes paper support tabs 70 and 72 and document slope 122. Document slope 122 includes a surface which is sloped in a generally downward direction from printer 20. Document slope 122 includes ribs 124 oriented in the direction of document travel which minimize friction between document slope 122 and travel documents, allowing travel documents to freely slide downwards from printer 20. Bottom edge 134 is arched from side to side to provide clearance for passports during insertion.

Document slope 122 and paper support tabs 70 and 72 are at different heights. Travel documents fall from document slope 122 onto paper support tabs 70 and 72.

Tray 112 further includes tabs 128 which snap into apertures 120 in hood 110. Tray may additionally include passport edge stops 130 extending in an opposite direction from paper support tabs 70 and 72, which act as guides for positioning passports within tunnel 52 for passport reading.

In addition to hood 110 and tray 112, paper chute 54 may additionally include a vertically oriented adapter wall 132 which slides sideways along tray 112 to facilitate use of different document widths.

Figure 5:
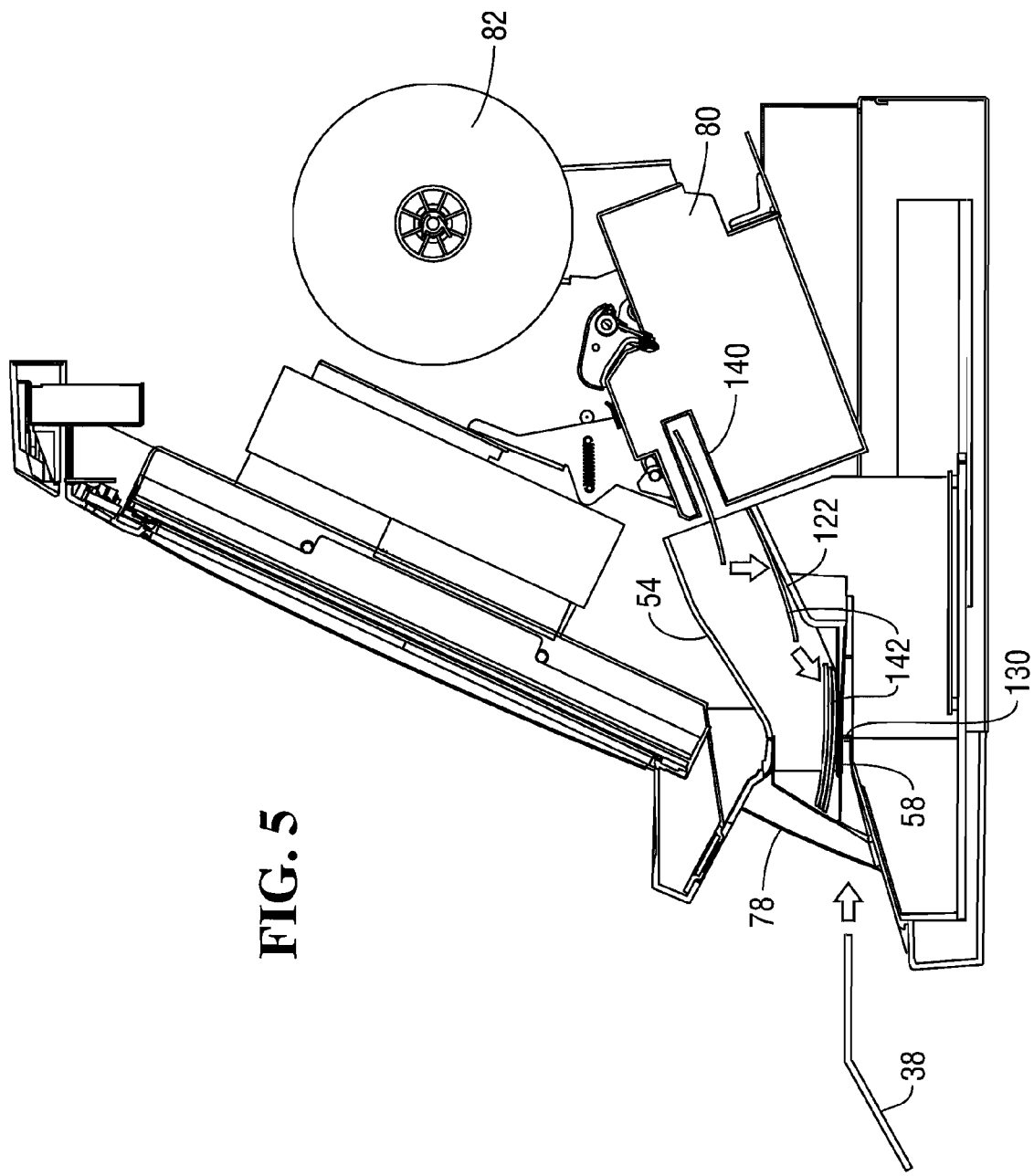
FIG. 5 is an inside cross-sectional view illustrating the position and operation of the paper delivery chute.

With reference to FIG. 5, travel documents 142 exit printer 80 at exit 140. Travel documents 142 fall to document slope 122 of tray 112. Travel documents 142 slide downwards and fall onto paper support tabs 70 and 72 in landing zone 58. Landing zone 58 accommodates stacking of multiple travel documents 142.

Although particular reference has been made to certain embodiments, variations and modifications are also envisioned within the spirit and scope of the following claims.

What is claimed is:

1. A kiosk comprising:
a first section containing a touch screen; and
a second section adjacent the first section including an aperture and a document delivery tray within the kiosk;
wherein the document delivery tray includes
a first portion including a document slope for receiving a document at an upper end from a printer, the document falling to a lower end of the document slope, the document slope including ribs oriented generally downwardly to minimize friction between the document and the document slope;
a second portion coupled to the first portion at the lower end including first and second tabs which form a landing zone for the document after it has fallen from the document slope, wherein a user of the kiosk reaches into the kiosk through the aperture to retrieve the document from the document delivery tray.

2. The kiosk of claim 1, wherein the second portion is located at a height generally midway in the aperture.

3. The kiosk of claim 1, wherein the lower end of the document slope includes an arch for providing clearance when a passport is inserted through the aperture below the document delivery tray.

4. The kiosk of claim 1, wherein the lower end of the document slope includes passport stops extending opposite to the first and second tabs.

5. The kiosk of claim 1 further comprising:
a camera which captures images of users.

6. The kiosk of claim 1 wherein the kiosk is a travel kiosk and the document is a travel document.

7. The kiosk of claim 1 further comprising:
a peripheral controller controlling a card reader and a barcode reader.

8. The kiosk of claim 1 wherein the touch screen displays instructions and receives touch entered data.

9. The kiosk of claim 1 wherein the aperture has a width which presents the document from falling through the aperture.

10. The kiosk of claim 1 further comprising:
a vertically oriented adapter wall which slides sideways along the document delivery tray to facilitate use of different document widths.

11. The kiosk of claim 1 wherein the aperture further comprises:
a document chute which couples behind an exterior wall of the kiosk and routes the document from the printer to the document delivery tray.

12. A travel kiosk comprising:
a first section containing a touch screen; and
a second section adjacent the first section including
a work area containing an aperture;
a card reader in the work area;
a barcode reader in the work area;
a passport reader for reading a passport placed within the aperture;
a printer; and
a document delivery tray coupled to the printer and located within the kiosk;
wherein the document delivery tray includes
a first portion including a document slope for receiving a document at an upper end from a printer, the document falling to a lower end of the document slope, the document slope including ribs oriented generally downwardly to minimize friction between the document and the document slope;
a second portion coupled to the first portion at the lower end including first and second tabs which form a landing zone for the document after it has fallen from the document slope, wherein a user of the kiosk reaches into the kiosk through the aperture to retrieve the document from the document delivery tray.

13. The travel kiosk of claim 12, wherein the second portion is located at a height generally midway in the aperture.

14. The travel kiosk of claim 12, wherein the lower end of the document slope includes an arch for providing clearance when a passport is inserted through the aperture below the document delivery tray.

15. The travel kiosk of claim 12, wherein the lower end of the document slope includes passport stops extending opposite to the first and second tabs.

* * * * *